April 18, 1933.   E. HURLBRINK   1,904,829
LIQUID DELIVERY AND MEASURING DEVICE
Filed Feb. 27, 1931   3 Sheets-Sheet 3
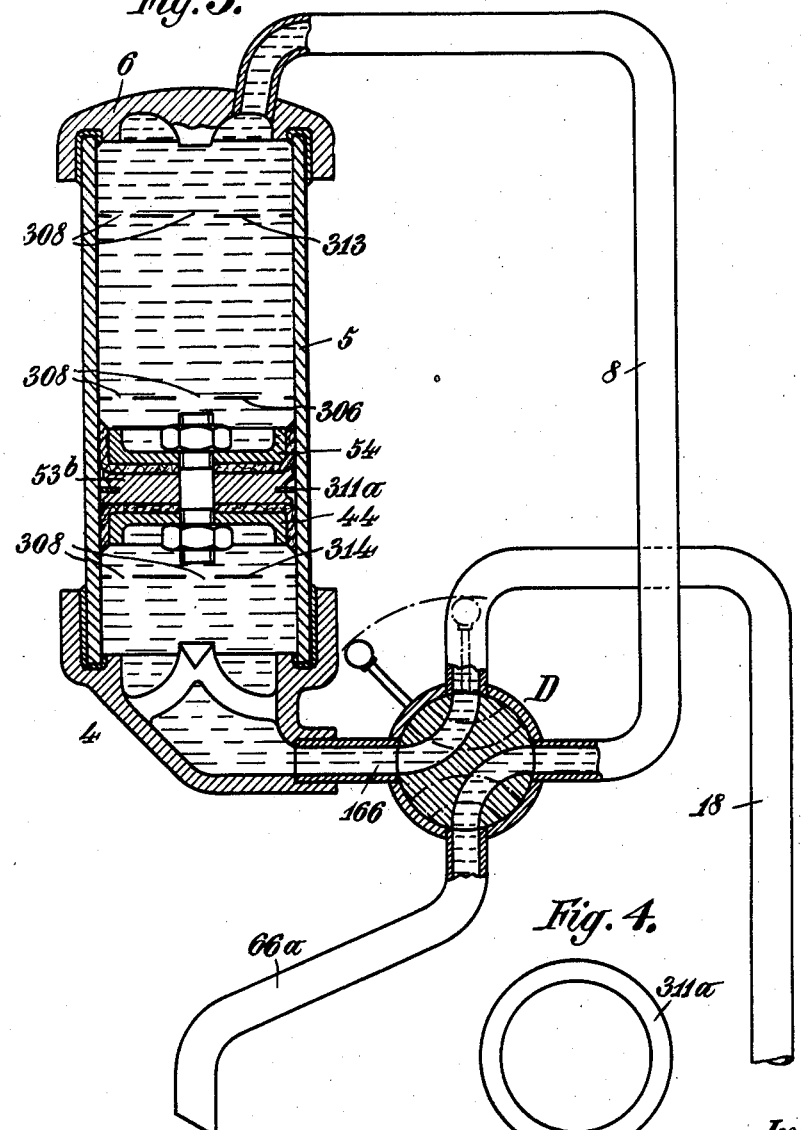
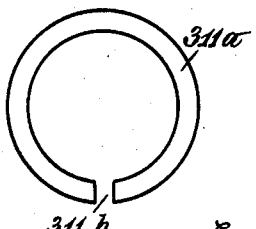
Inventor:
E. Hurlbrink
By Marks & Clerk
Attys.

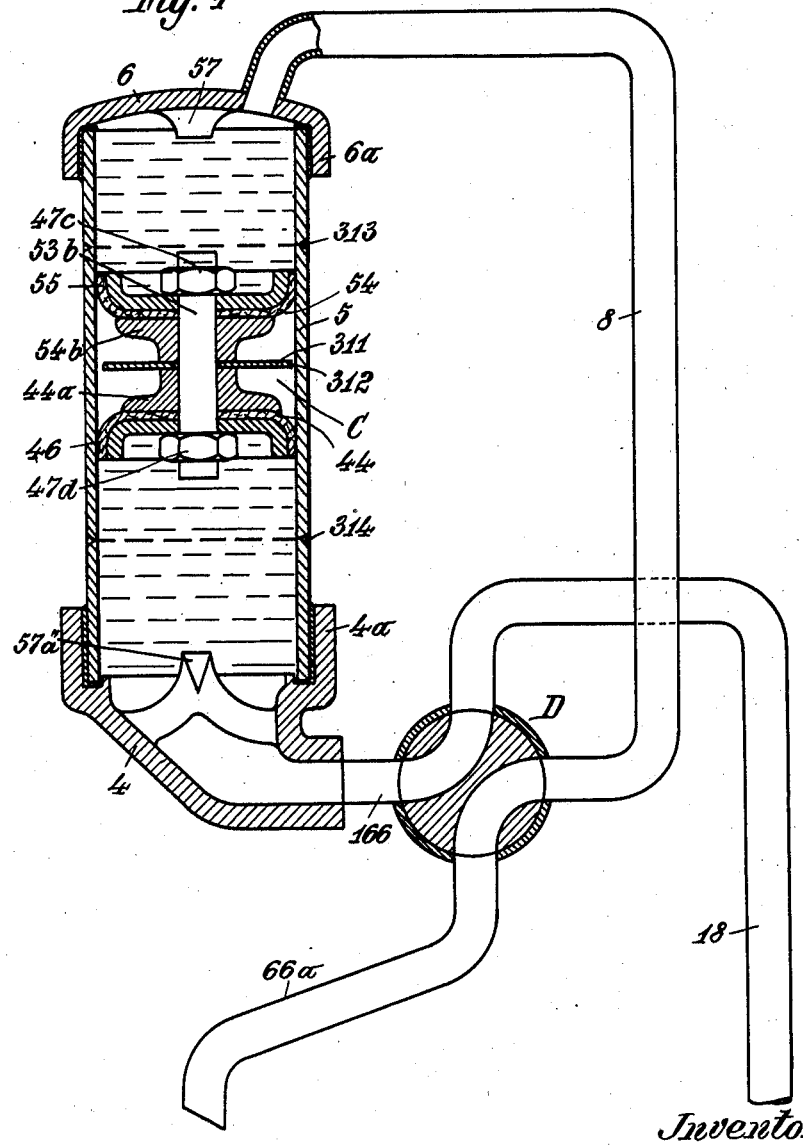

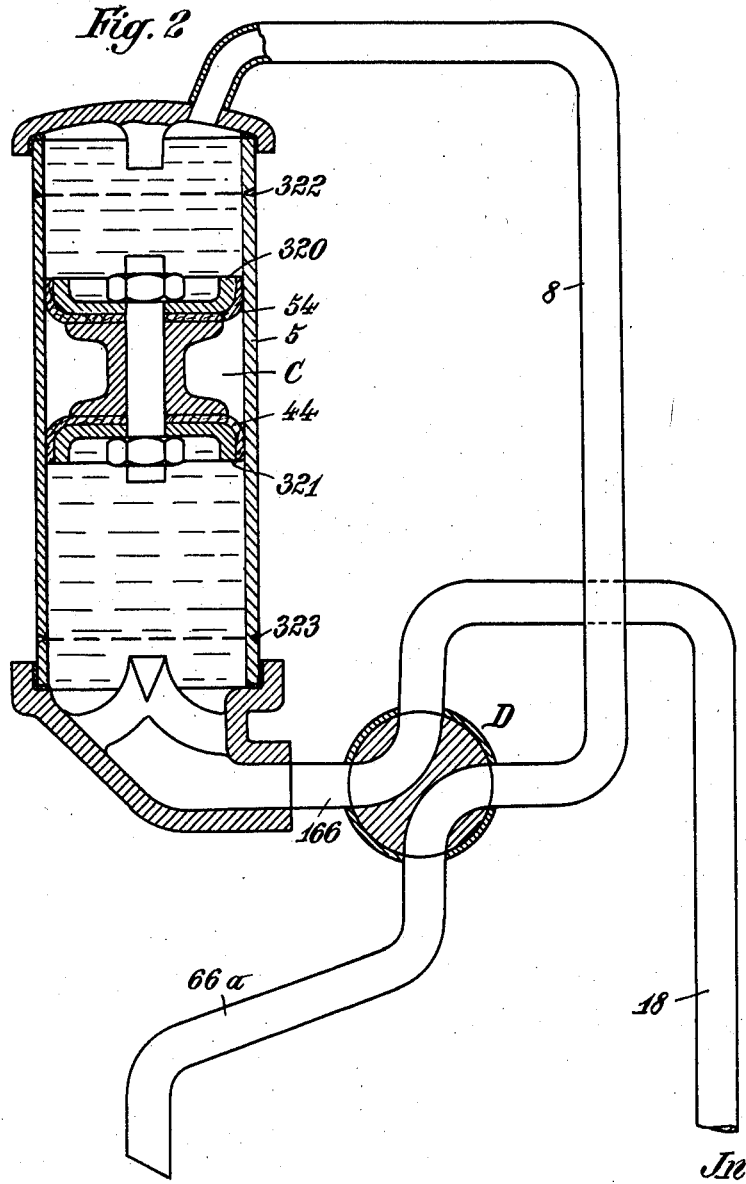

Patented Apr. 18, 1933

1,904,829

UNITED STATES PATENT OFFICE

ERNST HURLBRINK, OF BERLIN-WESTEND, GERMANY, ASSIGNOR TO THE FIRM FABRIK EXPLOSIONSSICHERER GEFÄSSE SALZKOTTEN G. M. B. H., OF SALZKOTTEN I. W., GERMANY

LIQUID DELIVERY AND MEASURING DEVICE

Application filed February 27, 1931, Serial No. 518,807, and in Germany January 14, 1930.

My invention relates to devices for dispensing and measuring of liquids, especially of fuels and lubricating oils, by means of a piston which reciprocates in a cylinder forming the measuring chambers, the liquid alternately being supplied into one of said measuring chambers through a supply-duct coming from the storage tank and being delivered from the other measuring chamber through the discharge duct leading to the tapping or delivery place and vice versa, the delivered quantity of liquid being measured by counting the strokes of the piston or the operations of a reversing member controlling the supply of the liquid to the one or the other of said measuring chambers.

The main object of my invention is to provide a device of the class described in which, generally spoken, the measurement in the measuring cylinder is better perceivable and the limits of the strokes of the measuring piston are to be ascertained in a more easy manner than heretofore.

With this and other objects in view which will be apparent from the following specification referring to the several embodiments represented by way of example in the accompanying drawings, my invention consists in the arrangement and construction of a fluid delivery and measuring device, of its elements and of the arrangement and combination of such elements all of which features are described in the specification and illustrated in the drawings and particularly set forth in the claims following the specification.

In the drawings, Figs. 1 to 3 show several forms of measuring cylinders according to my invention in vertical sections, the supply, discharge and delivery ducts being partly shown in elevation, the reversing member controlling the liquid supply and discharge being represented in a more conventional manner, Fig. 4 shows a detail.

When using measuring devices with pistons of the class described above for the measuring of dark or turbid liquids such as lubricating oil it is also in the case that the measuring cylinder is transparent not possible to ascertain by appearance the arrival of the piston at its stroke-limit. It is therefore desirable to equip the tapster with a means through which he may ascertain in a simple way whether the piston has executed its full stroke and the reversing valve may be actuated.

According to the present invention this means preferably consists in the arrangement of a mark forming a full ring on the measuring piston which mark registers in the end positions of the piston with marks provided on the measuring cylinder consisting of a transparent material. Especially in measuring pistons forming a twin-piston the annular mark may preferably consist of a thin disc which is arranged in the intervening space between the two piston-halves and which is in close proximity or even in contact with the inner surface of the cylinder. The material for such discs may preferably be a metal of light colour or celluloid, so that the ring-mark formed by the edge of said disc contrasts distinctly with the adjacent darker surface. Also the edges of the pistons or of the cups for tightening the piston-halves may serve as such annular marks. The linear marks on the cylinder preferably do not form uninterrupted lines but are provided with interruptions, so that also in the case of a complete registering with the annular mark of the piston the latter is well to be perceived. The arrangements which are in the following described in combination with measuring apparatus with hydraulically operated pistons may also be employed for measuring apparatus in which the measuring piston is operated manually or by a motor.

According to Fig. 1 the twin-piston 44, 54 operating freely in the glass cylinder 5 has in its middle an annular intervening space C in which a disc 311 forming the annular mark of the piston is arranged in such a way that in the assembling of the piston the disc is clamped between the two halves 44a, 54b of the piston-body. The clamping is executed by tightening the two nuts 47c, 47d which are screwed on the threaded ends of the bolts 53b keeping together the parts of the piston including also the tightening cups 46, 55. On the glass cylinder 5 annular linear marks 313, 314 are arranged in such a distance from the cylinder ends that they register with the visible edge 312 of the disc 311, as soon as the piston reaches its upper or its lower stroke-end. The piston-stroke is limited by abutments 57 and 57a provided on the upper cylinder-cover 6 and on the lower closure-mounting 4 respectively against which abutments the piston strikes in the respective end positions with the ends of its screw-bolt 53b keeping the two piston-halves together. In the described embodiment it is admissible that the covers or end-closures 6, 4 are provided with socket-rims 6a, 4a of relatively large breadth which reach so far beyond the cylinder-ends that the piston 44, 54 disappears with its ends behind the rims 6a and 4a, so that the erroneous impression is avoided that after the arrival of the piston at its stroke-end there would still exist any liquid above or below the piston which liquid could be dispensed with the other liquid.

In the case that a disappearing of the piston-ends behind the socket-rims of the closure-mountings 6, 4 is not considered necessary, the disc 211 may also be omitted, and the annular mark may be provided on the ends of the piston or be formed by the outer edges 320, 321 of the piston or by the edges of the respective piston-cups, as illustrated in Fig. 2. In this case the piston-edge 320 cooperates with the linear mark 322 and the piston-edge 321 with the linear mark 323. The marks 322, 323 are for this purpose displaced for a corresponding distance towards the cylinder-ends.

In the embodiment according to Fig. 3 the piston 44, 54 being also provided with two tightening cups is not subdivided in the middle, and there is also no real intervening space between the piston-halves. In the said embodiment the annular mark 331a forms a narrow ring set into an annular groove of the piston-body 53b. The colour of said ring is chosen in such a way that it contrasts distinctly with the other parts of the cylindrical surface of the piston. The piston may for instance be of a black or dark-brown colour, whereas the ring 311a may be made of a light-coloured metal such as German silver or of white celluloid or be provided with a corresponding painting. The linear marks 306, 313 and 314 of the glass cylinder 5 are preferably executed in a red or brown or any other colour which is different from that of the piston-mark. Further the cylinder-marks do not form endless rings but are provided with interruptions 308 through which the annular mark 311a of the piston is also well visible in the case of its complete registering with the linear marks 306, 313 or 314. The interruptions are especially valuable in the median linear mark 306 which serves for adjusting the piston in the median position designed by dotted lines, such adjustment being effected without a fixed stroke-limit, solely by a corresponding actuation of the reversing valve D.

In Fig. 4 a special embodiment of the annular mark or index-ring 311a is illustrated which is characterized by the feature that the ring is provided with a slit 311b like in a piston-ring, and that the outer diameter of said ring is somewhat larger than the inner diameter of the measuring cylinder 5. In the case that the ring is moreover made of a soft, elastic material such as celluloid, and is loosely inserted into the respective circumferential groove of the piston-body, the ring will lean elastically against the inner surface of the measuring cylinder. Thereby the perceptibility from the outside is also warranted in the case that the liquid to be measured is for instance a turbid oil. The measuring cylinder must be ground inside to procure a good tightening of the piston. But after the grinding the cylinder cannot be polished again, so that the glance across the respective surface is dull in spite of the fact that the liquid to be measured moistens the said surface. Already by a very small distance of the piston-mark from the cylinder-wall the perceptibility is highly decreased. This drawback is avoided by the ring 311a forming the piston-mark being shaped and arranged as described above, so that the said ring will constantly engage the cylinder-wall. By using a ring of celluloid or a similar soft material the wall of the glass cylinder will not be spoiled with scratches.

The improvements described with reference to the several figures are not only placed under protection in combination with those embodiments illustrated by the respective figures but also in combination with the embodiments shown in the other figures and generally in combination with dispensing and measuring devices of the class described.

I claim:

1. A device for dispensing and measuring of liquids, especially of lubricating oil, comprising: a measuring cylinder of a transparent material, a liquid supply duct, a liquid dispensing duct, a piston adapted to reciprocate in said measuring cylinder and to subdivide the said measuring cylinder into two measuring chambers, reversing means adapted alternately to connect the one or the other of said measuring chambers with the liquid supply duct or with the liquid dispensing duct respectively, said piston formed of two piston-parts spaced apart from each other with an intervening space between them, linear marks provided on the side wall of said measuring cylinder, and a flat disc secured to said piston between said piston-parts, the peripheric edge of said disc being closely adjacent to the inner face of said measuring cylinder and forming a ring mark being in alignment with said linear marks in each of the end positions of said piston.

2. A device for dispensing and measuring of liquids, especially of lubricating oil, comprising: a measuring cylinder of a transparent material, a liquid supply duct, a liquid dispensing duct, a piston adapted to reciprocate in said measuring cylinder and to subdivide the said measuring cylinder into two measuring chambers, reversing means adapted alternately to connect the one or the other of said measuring chambers with the liquid supply duct or with the liquid dispensing duct respectively, said piston formed of two piston-parts spaced apart from each other with an intervening space between them, linear marks provided on the side wall of said measuring cylinder, and a thin annular disc of a colour contrasting with the colour of the piston secured to the piston between said piston-parts, the outer edge of said annular disc extending closely to the inner face of the measuring cylinder.

3. A device for dispensing and measuring of liquids, especially of lubricating oil, comprising: a measuring cylinder of a transparent material, a liquid supply duct, a liquid dispensing duct, a piston adapted to reciprocate in said measuring cylinder and to subdivide the said measuring cylinder into two measuring chambers, reversing means adapted alternately to connect the one or the other of said measuring chambers with the liquid supply duct or with the liquid dispensing duct respectively, said piston formed of two piston-parts spaced apart from each other with an intervening space between them, linear marks provided on the side wall of said measuring cylinder, and a thin annular disc of an elastic material secured to said piston, the outer edge of said annular disc extending closely to the inner wall of the measuring cylinder.

4. A device for dispensing and measuring of liquids especially of lubricating oil, comprising: a measuring cylinder of a transparent material, a liquid supply duct, a liquid dispensing duct, a piston adapted to reciprocate in said measuring cylinder and to subdivide the said measuring cylinder into two measuring chambers, reversing means adapted alternately to connect the one or the other of said measuring chambers with the liquid supply duct or with the liquid dispensing duct respectively, said piston formed of two piston-parts spaced apart from each other with an intervening space between them, linear marks provided on the side wall of said measuring cylinder, and a narrow split ring of a flexible oil-proof material such as celluloid between said piston-parts, said ring having before being set into the cylinder an outer diameter somewhat larger than the interior diameter of the cylinder.

5. In a device for dispensing and measuring of lubricating oil, a measuring cylinder of a transparent material, a piston adapted to reciprocate in said measuring cylinder and having a circumferential recess between its ends, linear marks provided on the side wall of said measuring cylinder, and a thin annular disc of elastic material disposed within said recess and secured to said piston, said annular disc extending radially closely to the inner face of said measuring cylinder.

6. In a device for dispensing and measuring of lubricating oil, a measuring cylinder of a transparent material, a piston adapted to reciprocate in said measuring cylinder and having a circumferential recess between its ends, a plurality of linear marks, each formed of an interrupted circle around said measuring cylinder, and a flat disc secured to said piston within said recess, the peripheric edge of said disc being closely adjacent to the inner face of said measuring cylinder and adapted to register with each of said linear marks.

7. In a device for dispensing and measuring of lubricating oil, a measuring cylinder of a transparent material, a piston adapted to reciprocate in said measuring cylinder and having a circumferential recess between its ends, linear marks provided on the side wall of said measuring cylinder, and a thin annular disc of a colour contrasting with the colour of the piston and secured to the piston within its recess, the outer edge of said annular disc extending closely to the inner face of said measuring cylinder.

8. In a device for dispensing and measuring of lubricating oil, a measuring cylinder of a transparent material, a piston adapted to reciprocate in said measuring cylinder and having a circumferential recess between its ends, a plurality of linear marks each formed of an interrupted circle around said measuring cylinder, and a thin annular disc of an elastic material secured to said piston and adapted to register with each of said linear marks, the outer edge of said annular disc extending closely to the inner face of said measuring cylinder.

In testimony whereof I affix my signature.

ERNST HURLBRINK.